US010541395B2

(12) United States Patent
Bessho et al.

(10) Patent No.: US 10,541,395 B2
(45) Date of Patent: Jan. 21, 2020

(54) POWER SUPPLY DEVICE AND VEHICLE USING SAME

(71) Applicant: SANYO Electric Co., Ltd., Osaka (JP)

(72) Inventors: Toshihiko Bessho, Tokyo (JP); Kenichi Imai, Hyogo (JP)

(73) Assignee: SANYO ELECTRIC CO., LTD., Osaka (JP)

( * ) Notice: Subject to any disclaimer, the term of this patent is extended or adjusted under 35 U.S.C. 154(b) by 164 days.

(21) Appl. No.: 15/573,578

(22) PCT Filed: Jul. 11, 2016

(86) PCT No.: PCT/JP2016/003269
§ 371 (c)(1),
(2) Date: Nov. 13, 2017

(87) PCT Pub. No.: WO2017/017913
PCT Pub. Date: Feb. 2, 2017

(65) Prior Publication Data
US 2018/0138473 A1 May 17, 2018

(30) Foreign Application Priority Data

Jul. 30, 2015 (JP) ................................. 2015-150281

(51) Int. Cl.
*H01M 6/42* (2006.01)
*H01M 2/10* (2006.01)
*H01M 2/16* (2006.01)

(52) U.S. Cl.
CPC ....... *H01M 2/1077* (2013.01); *H01M 2/1653* (2013.01); *H01M 2220/20* (2013.01); *Y10S 903/907* (2013.01)

(58) Field of Classification Search
CPC ............. H01M 2/1077; H01M 2/1653; H01M 10/705; H01M 10/7005; H01M 2220/20;
(Continued)

(56) References Cited

U.S. PATENT DOCUMENTS 9,306,199 B2 * 4/2016 Merriman ........... H01M 2/1061
2013/0052516 A1 * 2/2013 Kim .................... H01M 2/1016
429/159
(Continued)

FOREIGN PATENT DOCUMENTS

JP 2013-045765 3/2013
JP 2014-044884 3/2014
(Continued)

OTHER PUBLICATIONS

International Search Report of PCT application No. PCT/JP2016/003269 dated Sep. 6, 2016.

*Primary Examiner* — Raymond Alejandro
(74) *Attorney, Agent, or Firm* — Wenderoth, Lind & Ponack, L.L.P.

(57) ABSTRACT

A power supply device includes: a plurality of secondary battery cells; separators having insulation property which are interposed between the adjacent secondary battery cells in a state where the plurality of secondary battery cells are stacked; end plates disposed at both end surfaces of a battery stacked body where the secondary battery cells and the separators are alternatively stacked; a pair of battery fastening members which fasten the end plates each other; and an intermediate bracket interposed at an intermediate portion of the battery stacked body. The pair of battery fastening members have fastening member-side fixing portions for fixing the intermediate bracket at an intermediate portion in a longitudinal direction of each of the pair of battery fastening members, the intermediate bracket has bracket-side fixing portions which are fixed to the fastening member-side fixing portions.

8 Claims, 15 Drawing Sheets

(58) Field of Classification Search
CPC .. B60L 50/64; B60K 1/04; B60K 6/28; Y02T 10/7005; Y02T 10/705
See application file for complete search history.

(56) References Cited

U.S. PATENT DOCUMENTS

| | | |
|---|---|---|
| 2013/0330579 A1 | 12/2013 | Ejiri et al. |
| 2016/0156077 A1* | 6/2016 | Shimouchi ........ H01M 10/6557 429/120 |
| 2016/0190526 A1 | 6/2016 | Yamada et al. |

FOREIGN PATENT DOCUMENTS

| | | |
|---|---|---|
| JP | 2016-122572 | 7/2016 |
| WO | 2012/131837 | 10/2012 |

* cited by examiner

POWER SUPPLY DEVICE AND VEHICLE USING SAME

This application is a U.S. national stage application of the PCT International Application No. PCT/JP2016/003269 filed on Jul. 11, 2016, which claims the benefit of foreign priority of Japanese patent application 2015-150281 filed on Jul. 30, 2015, the contents all of which are incorporated herein by reference.

TECHNICAL FIELD

The present invention relates to a power supply device and a vehicle using the same.

BACKGROUND ART

A power supply device using a secondary battery has been used for a power supply for driving a vehicle, for example. Such a power supply device generally has a configuration as shown in an exploded perspective view of FIG. 11. In FIG. 11, plural sheets of secondary battery cells 901 are stacked, and both ends thereof are covered with end plates 903, and then end plates 903 are fastened each other by right and left binding bars which are a pair of binding bars in each of right and left (for example, Patent Literature 1). When the output is increased, in such power supply device 900, it is thought that the number of secondary battery cells 901 is increased.

However, in the configuration where end plates 903 and the binding bars as mentioned above, when the number of secondary battery cells 901 is increased, the length of the module becomes long. Then, in response to this, the increase of the hardness is required. For example, as shown in FIG. 12A, FIG. 12B, when stress is added to the side surface of the battery stacked body, load is exerted to the binding bars at one side. Then, in order to correspond to this, it is necessary to increase hardness of the binding bars. Accordingly, countermeasures are required where a metal board constituting the binding bar is made thick, or strong material of the binding bar is used. As a result, problems in which the weight or cost is increased occur. Also, as the number of the secondary battery cells increase, misalignment of the battery cells located at the center may occur largely. Further, since the thickness of the secondary battery cell includes manufacturing allowance, when the number of the secondary battery cells is increased, dispersion of the thicknesses of the cells is accumulated as shown in FIG. 15. Then, countermeasure for absorbing this is necessary.

On the other hand, as shown in FIG. 13, FIG. 14, in power supply device 800 relating to Patent Literature 1, several section boards are disposed between end plates 803, and fixing points of the module are increased by bolts for fastening which pass through the section boards. This structure suppresses misalignment of the battery cells.

However, in the above-mentioned configuration, since load caused by the section boards is applied to the rods for fastening in a shearing direction, the rods for fastening may be damaged.

CITATION LIST

Patent Literature

Patent Literature 1: International Patent Publication No. 2012/131837

SUMMARY OF THE INVENTION

The present invention has been accomplished to solve such conventional problems. One of objects of the present invention is to supply a power supply device and a vehicle used the same in which adequate strength can be maintained even in a case where the number of stacked secondary battery cells is increased.

A first power supply device of the present invention includes: a plurality of secondary battery cells; separators having insulation property which are interposed between the adjacent secondary battery cells in a state where the plurality of secondary battery cells are stacked; end plates disposed at both end surfaces of a battery stacked body where the secondary battery cells and the separators are alternatively stacked; a pair of battery fastening members which fasten the end plates each other; and an intermediate bracket interposed at an intermediate portion of the battery stacked body. Further the pair of battery fastening members have fastening member-side fixing portions for fixing the intermediate bracket at an intermediate portion in a longitudinal direction of each of the pair of battery fastening members, and the intermediate bracket has bracket-side fixing portions which are fixed to the fastening member-side fixing portions. According to the above configuration, since intermediate part of the battery stacked body is reinforced by the intermediate bracket, there is a benefit of keeping rigidity even when the number of battery cells 1 to be stacked is increased.

According to a second power supply device, a direction of fixing axis along which the intermediate bracket and each of the battery fastening members are fixed by screw, is substantially perpendicular to a main surface of each of the battery fastening members. According to the above configuration, since the fixing axis is provided such that axis force is applied to the direction perpendicular to the battery fastening members, load to the battery fastening member can be reduced.

According to a third power supply device, the bracket-side fixing portions are open at side surfaces of the intermediate bracket. According to the above configuration, screwing work can be easily carried out at the side surface of the battery stacked body.

According to a fourth power supply device, each of the battery fastening members has: a fixing main surface having a flat board shape; a first bent board which is at least partially bent at one end edge along a longitudinal direction of the fixing main surface; a second bent board which is at least partially bent at other end edge along the longitudinal direction of the fixing main surface; and a third bent board and a fourth bent board which are at least partially bent at end edges crossing the longitudinal direction of the fixing main surface. According to the above configuration, the battery fastening member has both of reversed C-shape cross sections along and intersecting the longitudinal direction, by bending each end edge of the fixing main surface, thereby being capable of enhancing rigidity.

According to a fifth power supply device, an end edge of a longitudinal direction of the second bent board of each of the battery fastening members, projects from the end edge of the fixing main surface, as a projecting board, a projecting board side screw hole at the projecting board for screwing one of the end plates, is open. The projecting board is bent so as to overlap the third bent board, and the projecting board-side screw hole is aligned to the third screw hole. According to the above configuration, in the battery fastening member, a portion screwed to the end plate is configured of the crossing boards like three dimensions, and then strong fixing structure can be realized.

According to a sixth power supply device, the intermediate bracket is made of According to the above configuration, it is possible to surely insulate the intermediate bracket from the secondary battery cells. Thus, it is not necessary to separately prepare insulating structure.

According to a seventh power supply device, the bracket-side fixing portions are insert-molded integrally with the intermediate bracket, as metal screw portions for screwing to the battery fastening members.

According to an eighth power supply device, the metal screw portions are provided on the same line at each of the side surfaces of the intermediate bracket, and the metal screw portions are disposed in spaced relationship with each other on the same line. According to the above configuration, screws do not pass through the side surfaces of the intermediate bracket, and the use amount of metal material is reduced, and then light weight and low cost can be accomplished.

According to a ninth power supply device, the pair of battery fastening members have fastening member-side fixing portions for fixing the intermediate bracket at an intermediate portion in a longitudinal direction of each of the pair of battery fastening members, and the intermediate bracket has bracket-side fixing portions which are fixed to the fastening member-side fixing portions. According to the above configuration, since the fastening member-side second fixing portion is provided at a portion crossing the fastening member-side fixing portions and the bracket-side fixing portions, the battery fastening member and the intermediate bracket can be fixed at locations where those fixing portions cross each other, and then strong fixing structure against forces from different directions can be realized.

According to a tenth power supply device, the intermediate bracket is disposed at a central location of the battery stacked body. According to the above configuration, the central portion is fixed in a well-balanced state, high hardness of the battery fastening member can be stably performed.

An eleventh vehicle has the above-mentioned power supply device.

DESCRIPTION OF EMBODIMENT

Figure 1:
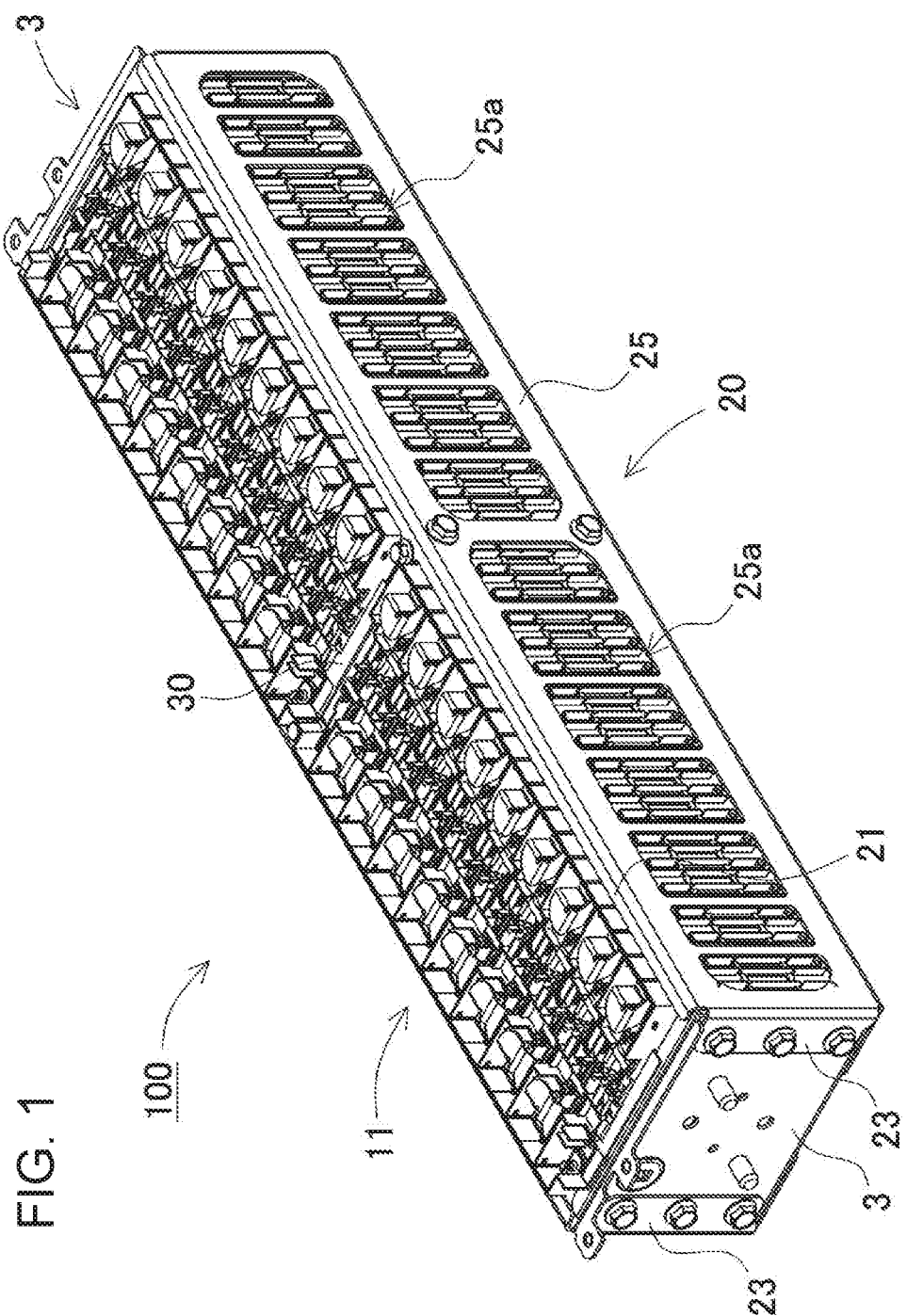
FIG. 1 is a perspective view of a power supply device according to one exemplary embodiment of the present invention.
Figure 2:
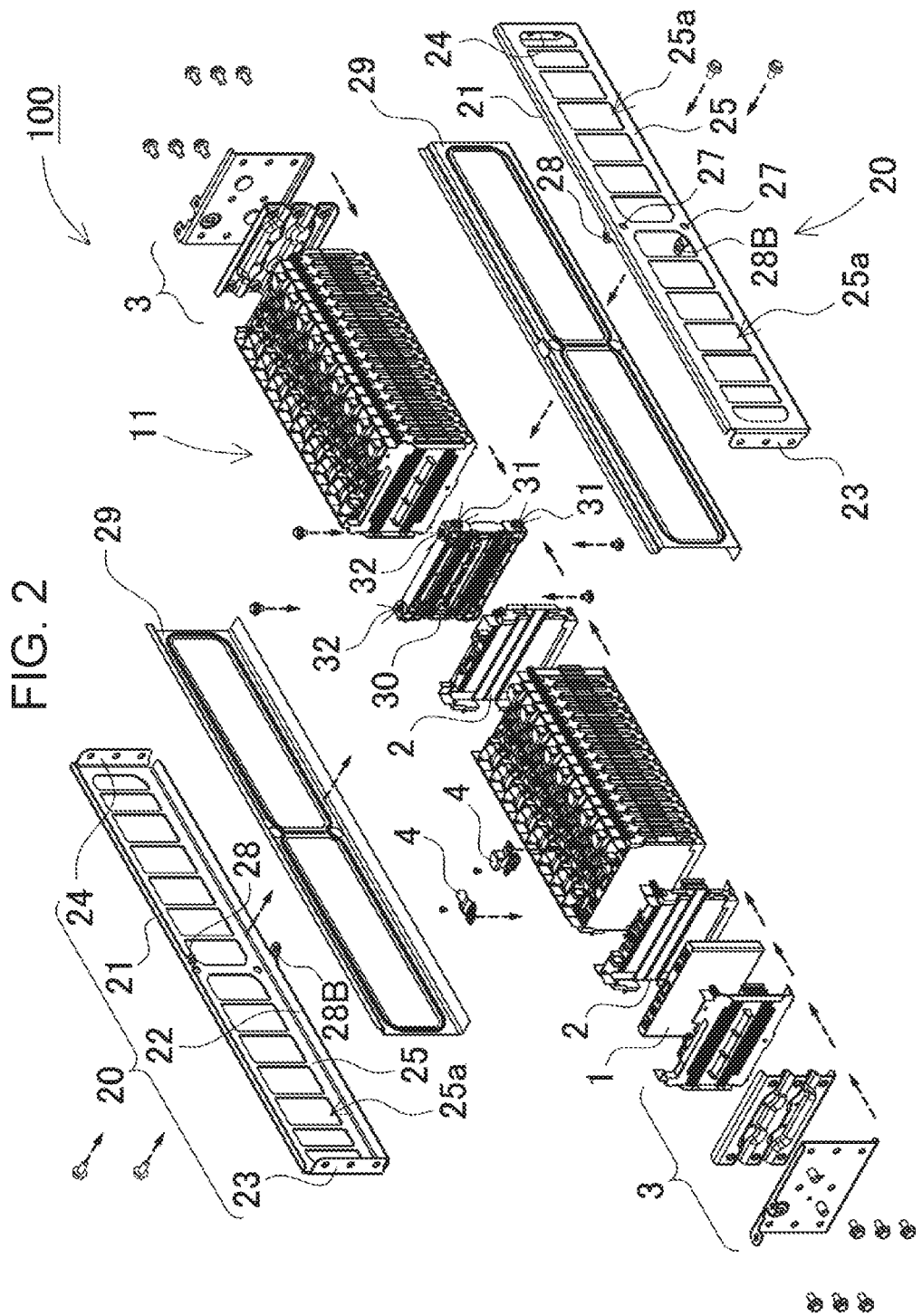
FIG. 2 is an exploded perspective view of the power supply device of FIG. 1.
Figure 3:
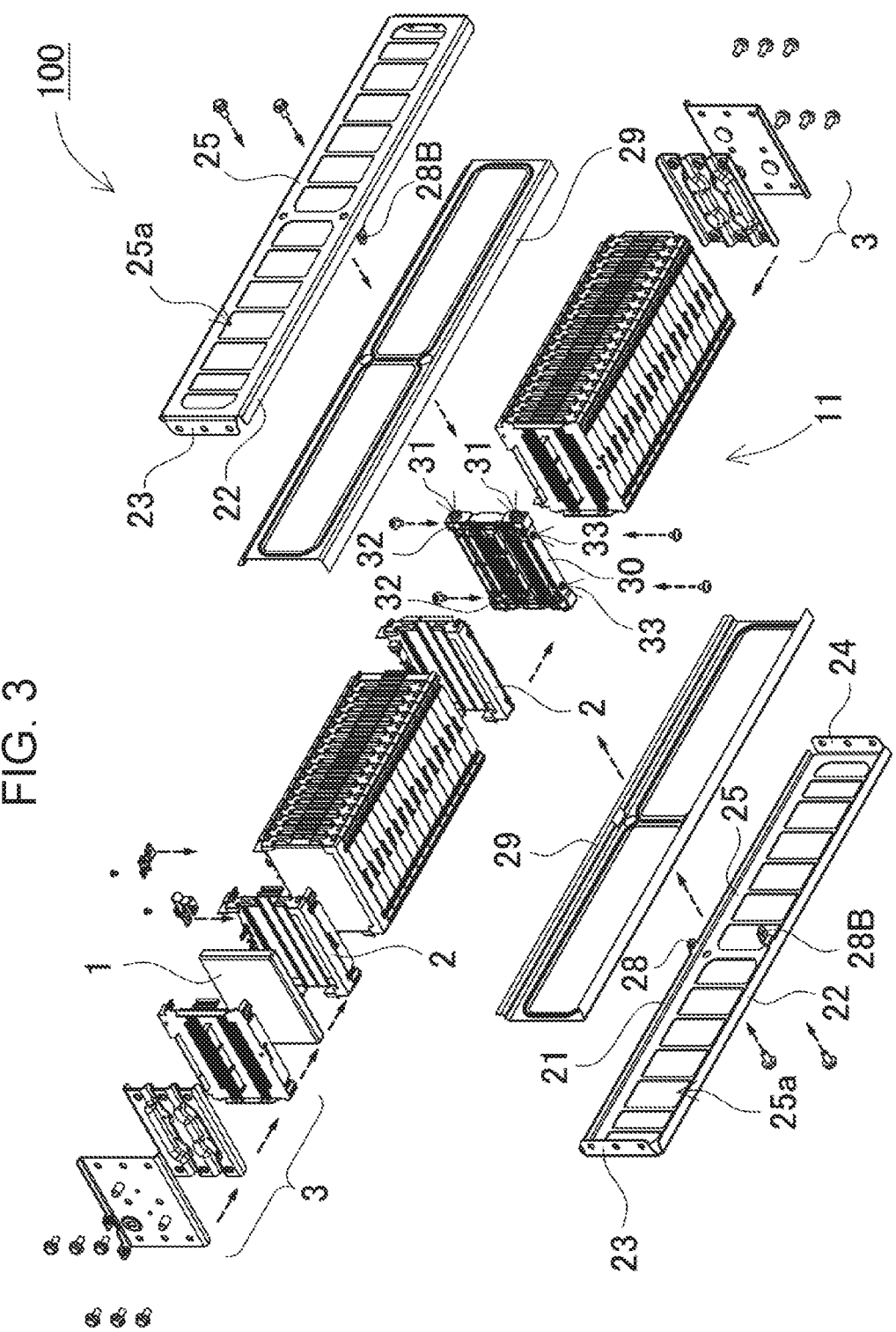
FIG. 3 is an exploded perspective view from the diagonally lower side of the power supply device of FIG. 1.

Power supply device 100 according to one exemplary embodiment of the present invention is illustrated in FIGS. 1 to 3. Power supply device 100 shown in these figures is an example of a power supply device for a vehicle. Concretely, this power supply device 100 is incorporated mainly in electric vehicles such as hybrid cars or electric cars, and is used as a power source for supplying electric power to a driving motor of the vehicle and driving the vehicle. The power supply device of the present invention can be used for electric vehicles other than hybrid cars or electric cars, and can be used for use other than the electric vehicle, where high output is required.

[Power Supply Device 100]

Power supply device 100 shown in FIGS. 1 to 3 includes battery stacked body 11 in which a plurality of secondary battery cells 1 are stacked, and battery fastening members 20 which fasten this battery stacked body 11. Secondary battery cells 1 has a board shape where the thickness is smaller than the width, and a rectangular main surface in the board shape. A plurality of secondary battery cells 1 are stacked. Further, secondary battery cells 1 are insulated from each other by insulating members such as separators 2 therebetween. In addition, battery stacked body 11 has intermediate bracket 30 interposed at the intermediate part of battery stacked body 11. In a state where secondary battery cells 1 and separators 2 are alternatively stacked, both end surfaces of battery stacked body 11 are covered with end plates 3. Battery fastening members 20 fix this pair of end plates 3 each other, and thus battery stacked body 11 is sandwiched and held between end plates 3.

[Secondary Battery Cells 1]

The outer can constitutes the outer shape of each of secondary battery cells 1, and is a rectangular shape where the thickness is smaller than the width. The outer can is formed in a bottomed pipe shape which is open upward, and its opening portion is closed by a sealing plate. An electrode assembling body is housed in the outer can. The sealing plate has the positive and negative electrode terminals and the gas exhaust valve between those electrode terminals. Secondary battery cells 1 are electrically connected each other by bus-bars 4 or the like. Bus-bar 4 is formed by bending a metal board.

The insulating member such as separator 2 made of resin, is interposed between adjacent secondary battery cells 1 to insulate them each other. Also, the surface of secondary battery cell 1 can be covered with insulating member. For example, the surface of secondary battery cell 1 except for the electrode terminals, is covered with a heat shrink tube made of PET resin or the like, and then the heat shrink tube is shrunk or contracted by adding heat. In this case, separators can be omitted.

[Separator 2]

Figure 4:
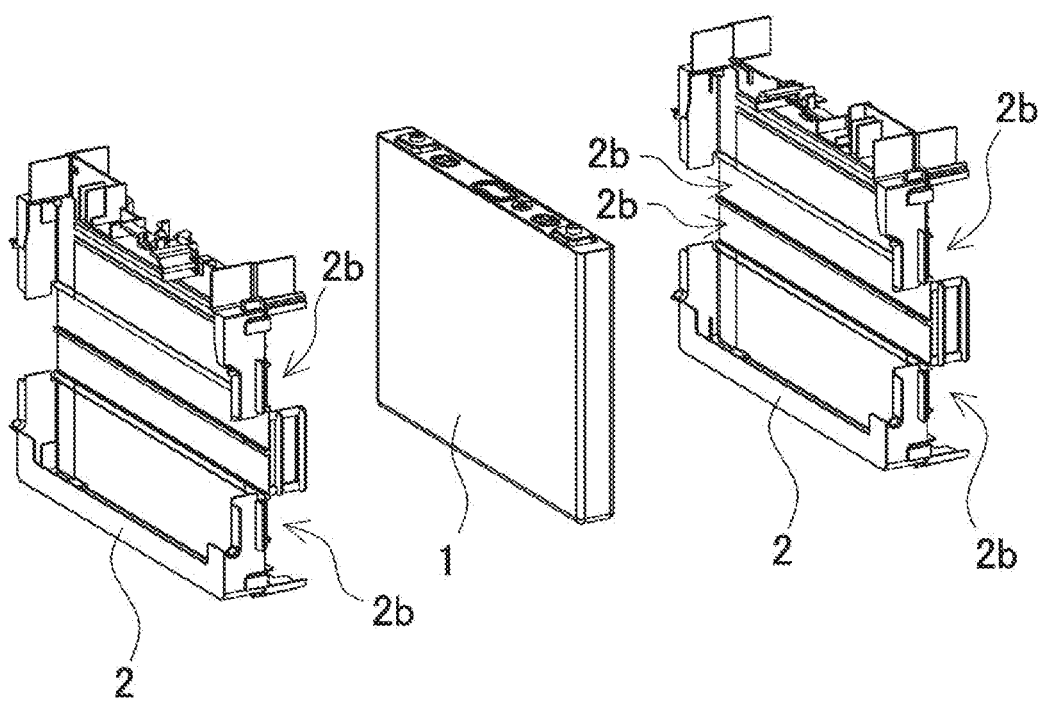
FIG. 4 is an exploded perspective view showing a battery cell and separators.

As shown in an exploded perspective view of FIG. 4, separators 2 are interposed between facing main surfaces of adjacent secondary battery cells 1 to insulate them each other. This separator 2 is formed in a size which covers the entire surface or the most part of the main surface of secondary battery cell 1. Also, separator 2 has cooling gaps 2*b* between adjacent secondary battery cells 1, through which cooling gas is passed. Each of separators 2 is bent or formed in a shape which has projections and recesses for forming cooling gaps 2*b* between adjacent secondary battery cells 1. Thereby, in battery stacked body 11, secondary battery cells 1 are stacked in a state where cooling gaps 2*b* are made. Cooling gaps 2*b* are communicated with a cooling structure which forcibly blows cooling gas such as air for cooling. Further, this separator 2 is connected to secondary battery cells 1 at both surfaces of this separator 2 by press-fitting structure. By using separators 2 which are connected to secondary battery cells 1 by press-fitting structure, secondary battery cells 1 are stacked, while preventing misalignment of adjacent secondary battery cells 1.

A material of the separator has insulation property. For example, the separator is made of resin such as plastic, thereby is lightweight and inexpensive. The separator is made of hard material, on the other hand the separator can be made of material having flexibility. Especially, a separator without a cooling gap can be made of flexible thin material such as tape. By using the tape-type separator of which one surface is coated with adhesive, the tape-type separator can easily be stuck to regions which need insulation, such as the main surface, or the partial side surface of secondary battery cell 1. In addition, since the separator can easily be made thin by using the tape-type separator, increases in the thickness or weight of battery stacked body 11 can be suppressed.

[End Plate 3]

A pair of end plates 3 is disposed on both end faces of battery stacked body 11 to fasten battery stacked body 11 where the secondary battery cells and the separators are alternatively stacked. End plate 4 is made of a material exerting sufficient strength, such as metal. Notably, the end plate can be made of a resin material, or configured such that the resin end plate is reinforced by a metallic member. In the example of FIG. 2, FIG. 3, end plate 3 is configured of stacked plural sheets of resin board and metal board.

[Battery Fastening Member 20]

As illustrated in FIGS. 1 and 3, battery fastening members 20 are disposed on the side surfaces of battery stacked body 11 on which end plates 3 are stacked on both ends, and fasten battery stacked body 11 by the pair of end plates 3 fixing. Battery fastening member 20 is formed in a board shape which extends in the stacked direction of battery stacked body 11. Concretely, battery fastening member 20 includes fastening main surface 25 having a flat board shape, covering the side surfaces of battery stacked body 11. Also, battery fastening member 20 includes first bent board 21, second bent board 22, third bent board 23, and fourth bent board 24, as bent boards where end edges of battery fastening member 20 are bent. First bent board 21 is an upper end bent board which is bent at the upper end side as one of end edges along a longitudinal direction of fixing main surface 25. Also, second bent board 22 is an lower end bent board which is bent at the lower end side as another of end edges along the longitudinal direction of fixing main surface 25. Further, third bent board 23 is an end plate fixing board which is partially bent at the front end side of end edges crossing the longitudinal direction of fixing main surface 25. Lastly, fourth bent board 24 is an end plate fixing board which is partially bent at the back end side of end edges crossing the longitudinal direction of fixing main surface 25. Thus, battery fastening member 20 has both of reversed C-shape cross sections along and intersecting the longitudinal direction, by bending each end edge of fixing main surface 25, thereby being capable of enhancing rigidity.

Also, battery fastening member 20 is screw fixed to end plates 3 by the end plate fixing boards. Further, the upper end bent board partially covers the corner portion on the upper surface of battery stacked body 11, and the lower end bent board partially covers the corner portion on the lower surface of battery stacked body 11, while increasing strength. Here, power supply device 100 can be fixed on a mounting place, for example, inside a vehicle, by screw or the like.

Preferably, binding bars which are formed by bending metal boards, are used as battery fastening members 20. Also, it is necessary that battery fastening members 20 have adequate strength so as to sandwich and hole battery stacked body 11 for a long time. Thereby, high-tensile steel, general steel, stainless, aluminum alloy, magnesium alloy, or the like, and a combination of some of them can be used. Those are excellent in hardness and heat conduction. In the example of FIG. 1 or the like, battery fastening members 20 are made of Fe-based metal as a first metal.

Also, the battery fastening member can be in another shape. For example, it may has a shape in which both ends of an extended belt-shaped metal board are bent in a sectional U-shape. Here, the battery fastening member can be disposed at the upper surface of the battery stacked body other than the side surface thereof. Also, the substructure where the battery fastening member is fixed to the end plates, is not limited to screwing, a conventional fixing structure such as a rivet, caulking, welding, or adhesion can be used appropriately. Further, opening sections 25*a* can be provided at fastening main surfaces 25 of the battery fastening members, so as to blow a cooling gas between the adjacent secondary battery cells 1. In the example of FIGS. 1 to 3, a plurality of opening sections 25*a* are provided at fastening main surfaces 25 of battery fastening members 20, such that cooling gaps 2*b* formed by separators 2 between secondary battery cells 1 open at the side surfaces of battery fastening members 20. It is preferable that battery fastening member 20 is made of metal, to prevent decrease in strength of battery fastening member 20 caused by providing opening sections 25*a*. Further, it is preferable that the opening section is not provided at portions having screw holes as fastening member-side fixing portions 27 for connecting to intermediate bracket 30. Thereby, it is prevented that strength of battery fastening member 20 decreases at fixing portions connected to intermediate bracket 30, and reliability can be improved. Also, since the secondary battery cell is not located at the portion of intermediate bracket 30, there is no cooling gap for cooling the secondary battery cell, and it is not necessary to provide the opening section. Thus, the opening section is not provided, or decreased area of the opening section is provided, at a portion where strength is necessary. Therefore, decreases in strength or hardness can be prevented, while securing cooling performance of the secondary battery cells.

In order to prevent unintentionally short-circuiting the outer can of the secondary battery cell to battery fastening member 20 caused by covering the side surface of battery stacked body 11 with metal battery fastening member 20, insulating structure between battery fastening member 20 and battery stacked body 11 can be provided. In the example of FIGS. 2 to 3, insulating board 29 is interposed between metal battery fastening member 20 and battery stacked body 11. Insulating board 29 is made of insulating material, for example, such as resin sheet, or paper. Additionally, insulating board 29 has the substantially same shape as battery fastening member 20, and then this structure prevents the side surface of battery stacked body 11 from contacting battery fastening member 20. Further, in the example, insulating boar 29 also has opening sections such that insulating board 29 does not close cooling gaps 2b of separators 2.

[Intermediate Bracket 30]

In addition, intermediate bracket 30 is interposed at the intermediate part of battery stacked body 11. Further, fixing intermediate bracket 30 is fixed to an intermediate portion in a longitudinal direction of battery fastening member 20. Thus, the pair of battery fastening members 20 have fastening member-side fixing portions 27 for fixing intermediate bracket 30 at the intermediate portion in the longitudinal direction of each of the pair of battery fastening members 20. In contrast, intermediate bracket 30 has bracket-side fixing portions 31 which are fixed to fastening member-side fixing portions 27. Thus, in the embodiment, since intermediate part of battery stacked body 11 is reinforced by intermediate bracket 20, there is a benefit of keeping rigidity even when the number of battery cells 1 to be stacked is increased.

Figure 11:
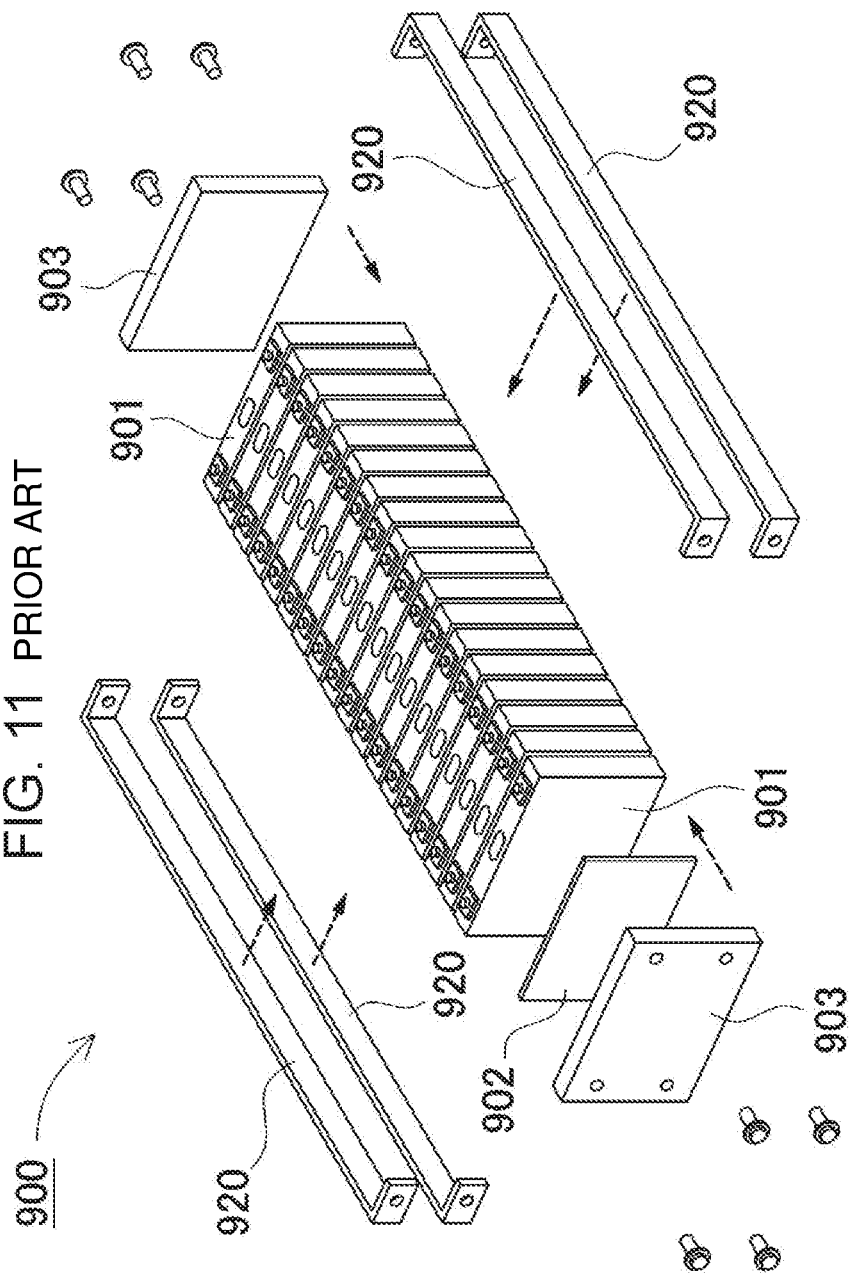
FIG. 11 is an exploded perspective view of a conventional power supply device.
Figure 12A:
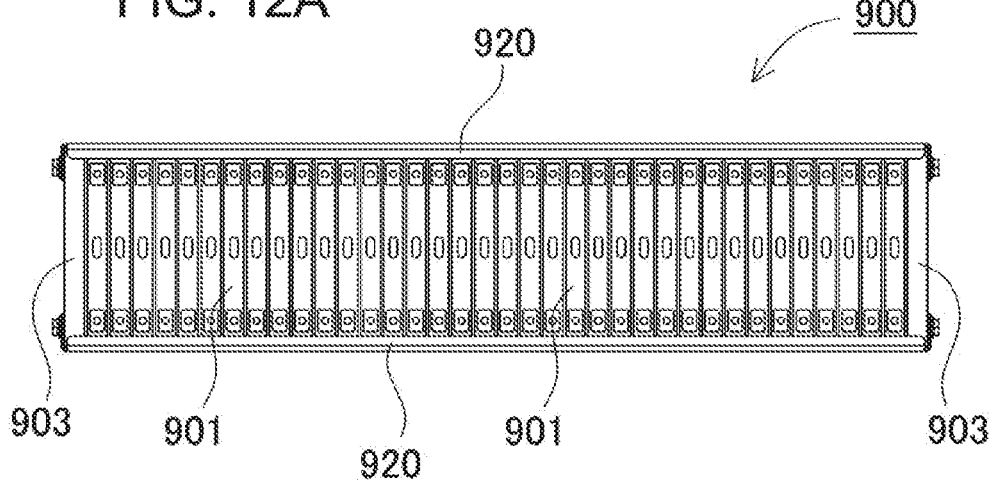
FIG. 12A is a schematic plan view of a power supply device without an intermediate bracket.
Figure 12B:
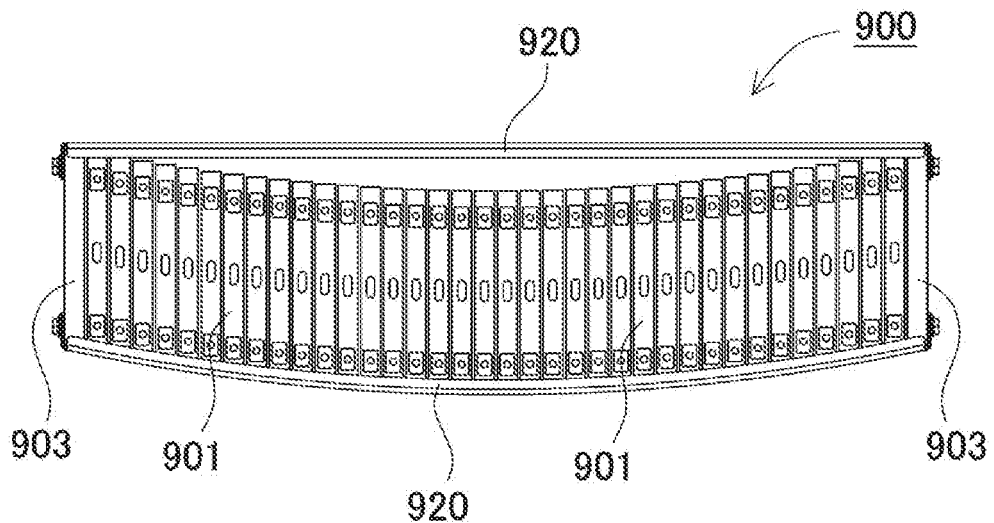
FIG. 12B is a schematic plan view in a state where stress is applied to a side surface of the power supply device of FIG. 12A.
Figure 13:
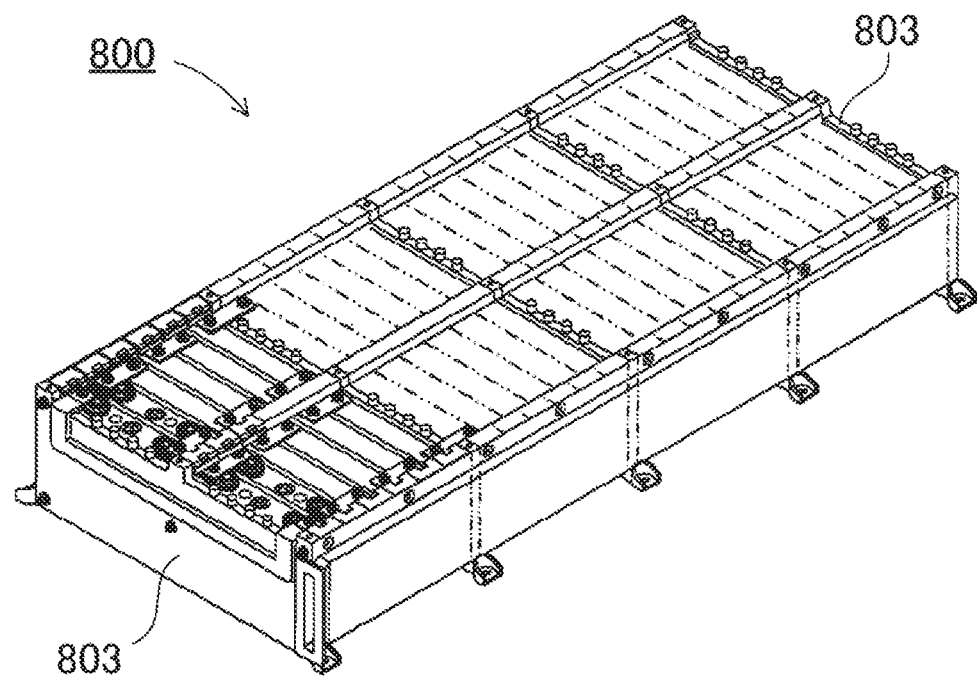
FIG. 13 is a perspective view of another conventional power supply device.
Figure 14:
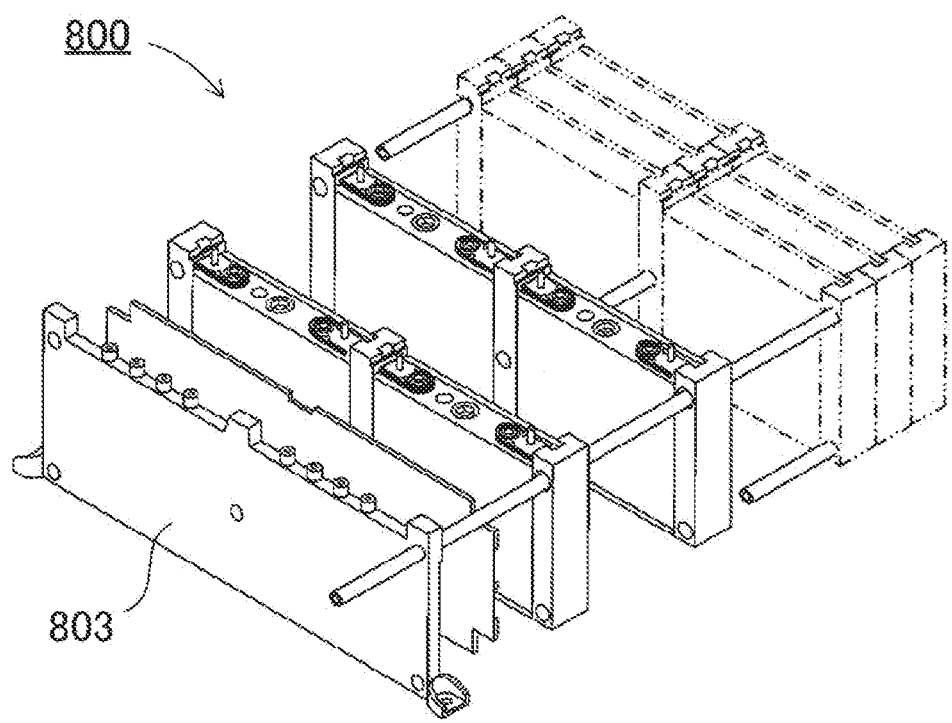
FIG. 14 is an enlarged exploded perspective view of the power supply device of FIG. 13.

As shown in an exploded perspective view of FIG. 11, in conventional power supply device 900, end plates 903 of both end surfaces are fastened by binding bars. In this example, eighteen cells of secondary battery cells 901 each having a thin rectangular shape are stacked, interposing separator 902, and the pair of end plates 903 are disposed at both end surfaces of the battery stacked body, and the pair of end plates 903 at both end surfaces are fastened by the binding bars. In this configuration, since only end plates 903 are fixed to the binding bars, the binding bars are not fixed to the battery stacked body which is configured of secondary battery cells 901 sandwiched by the binding bars and separators 902. In such a configuration, as shown in FIG. 12A, FIG. 12B, when stress is added to the side surface of the battery stacked body, load is exerted and concentrated to the binding bars at one side. Then, in order not to break the binding bars, it is necessary to increase hardness of the binding bars. Accordingly, countermeasures are required where a metal board constituting the binding bar is made thick, or a metal board having high hardness is used. As a result, problems in which the weight or cost is increased occur. Especially, when the thickness of the binding bar is increased, the weigh is increased. Therefore, such a power supply device is not preferable for use of a vehicle.

Figure 5A:
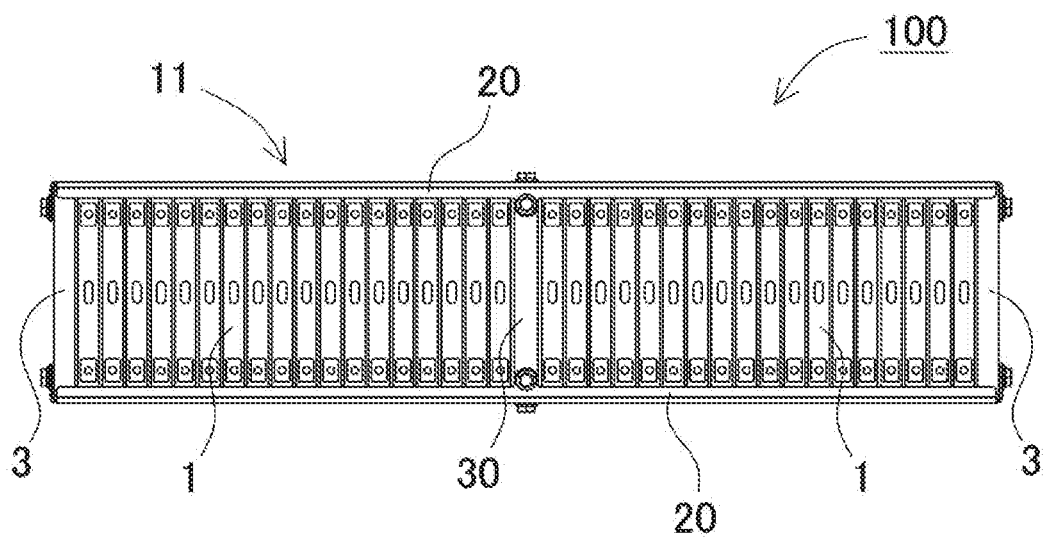
FIG. 5A is a schematic plan view of the power supply device of FIG. 1.
Figure 5B:
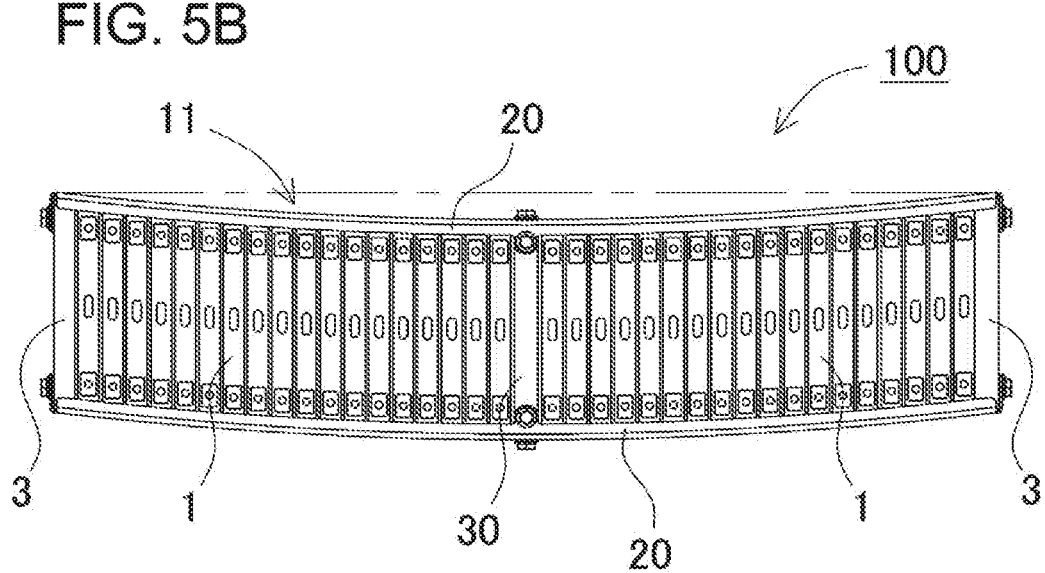
FIG. 5B is a schematic plan view in a state where stress is applied to a side surface of the power supply device of FIG. 5A.

In contrast, in the embodiment, intermediate bracket 30 is provided at the intermediate portion, and further is fixed to the pair of battery fastening members 20. In other words, the pair of battery fastening members 20 are fixed to each other at the intermediate portion through intermediate bracket 30. As shown in FIG. 5A, FIG. 5B, even when stress is added to the one side surface of power supply device 100, the pair of battery fastening members 20 receive stress. Compared with configuration shown in FIG. 12A, FIG. 12B, it is not necessary to increase hardness of the binding bars, and then low cost and light weight can be realized by using thin binding bars.

Figure 6:
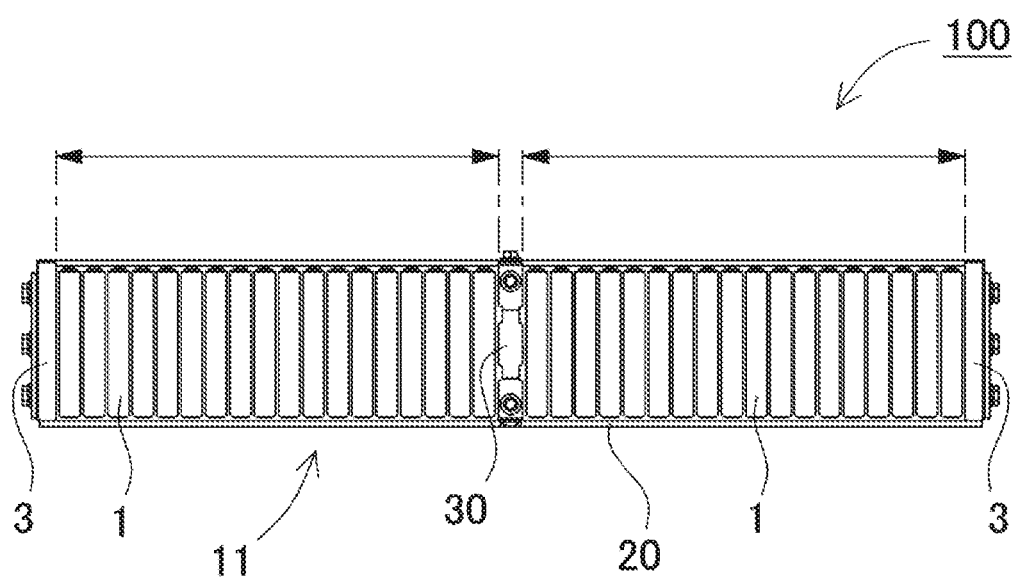
FIG. 6 is a schematic plan view of a power supply device according to one exemplary embodiment of the present invention.
Figure 15:
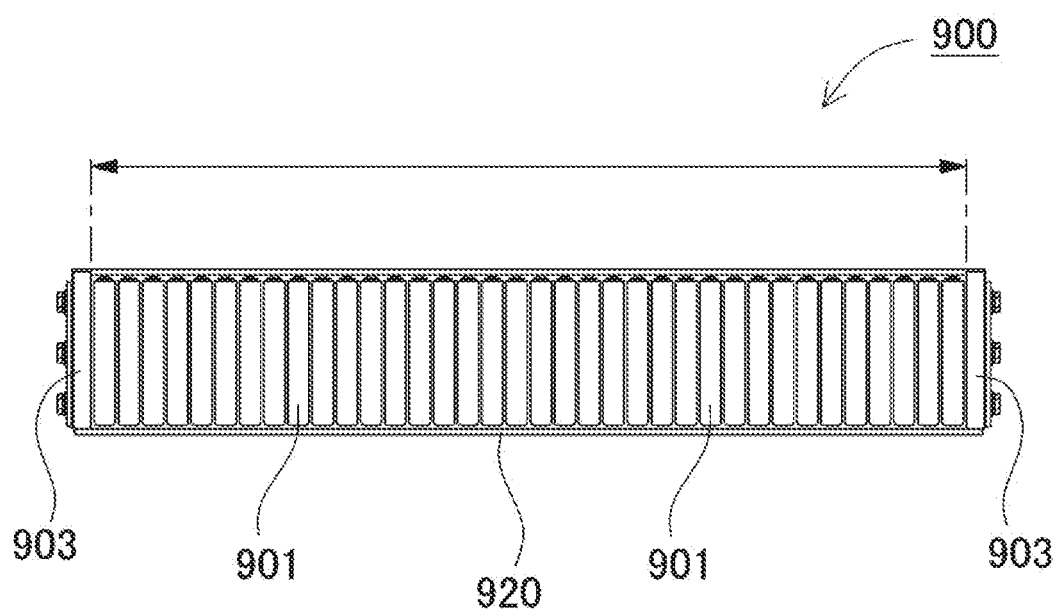
FIG. 15 is a schematic plan view of a conventional power supply device. a schematic plan view in a state where size error of a power supply device is absorbed by an intermediate bracket.

Further, as shown in FIG. 6, FIG. 15, dispersion of the thicknesses of the secondary battery cells is suppressed by intermediate bracket 30. Namely, as shown in FIG. 15, Further, when the number of the stacked secondary battery cells is increased, dispersion of the thicknesses of secondary battery cells 901 is accumulated. Similarly, since separator 902 includes manufacturing allowance, dispersion of the thicknesses of separators 902 is accumulated in the same way as the number of secondary battery cells 901. In a case where battery fastening members 920 fasten this, in the configuration where simply end plates 903 sandwich and hold this, when the length of battery fastening member 920 is not the length corresponding to dispersion of the thicknesses of secondary battery cells 901 and separators 902 as shown in FIG. 15, it is difficult to maintain an appropriate sandwiching and holding state. In contrast, as shown in FIG. 6, by disposing intermediate bracket 30 in the middle, half parts of battery stacked body 11 are respectively sandwiched and held, between one surface of intermediate bracket 30 and one end plate 3, between another surface of intermediate bracket 30 and another end plate 3. Thus, since the stacked number of battery stacked body 11 is half, accumulated error is reduced, and then battery fastening member 20 can easily fasten. In other word, dispersion of fastening states in the battery fastening members among the battery supply devices, can be suppressed. Then, the fastening state of each of the battery supply device can be maintained constantly.

The location where intermediate bracket 30 is disposed in battery fastening member 20, is preferably at the substantially center in the longitudinal direction of battery fastening member 20. However, it is possible to dispose and fix the intermediate bracket at the location eccentric toward one side. Especially, when the number of the stacked secondary battery cells is an even number, it is possible to dispose the intermediate bracket at the center, but when the number of the stacked secondary battery cells is an uneven number, it is difficult to dispose the intermediate bracket at the center. Even in these cases, the present invention can be used appropriately.

Figure 7:
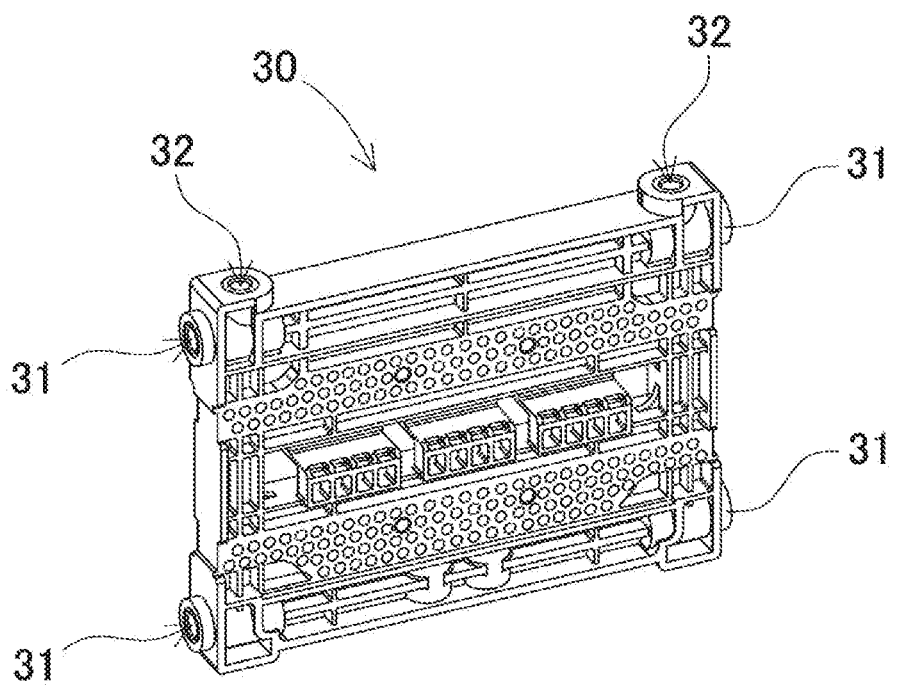
FIG. 7 is a perspective view of an intermediate bracket.

A perspective view of intermediate bracket 30 is shown in FIG. 7. Intermediate bracket 30 is preferably made of resin. Accordingly, it is possible to surely insulate intermediate bracket 30 from secondary battery cells 1. Thus, it is not necessary to separately prepare insulating structure. Examples of the resin material include crystal polymer (LCP), polyphenylene sulfide (PPS), polyether sulfone (PES), polybutylene terephthalate (PBT), polyamide imide (PAI), polyphthalamide (PPA), polybutylene terephthalate (PEEK), or the like.

[Bracket-Side Fixing Portion 31]

In contrast, intermediate bracket 30 has bracket-side fixing portions 31 which are fixed to fastening member-side fixing portions 27 of battery fastening member 20. Bracket-side fixing portions 31 are metal screw portions for screwing battery fastening member 20. This screw portion is insert-molded integrally with resin intermediate bracket 30. Intermediate bracket 30 is hybrid material combining resin and metal. Therefore, intermediate bracket 30 is made of resin which is light weight and easily molded, while fixing portions, to battery fastening member 20, which is required to be strength and durability, is made of metal. Thus, it is possible to increase reliability. Bracket-side fixing portions 31 are open at the side surfaces of intermediate bracket 30. Since screw holes of the screw portions are open at the side surface side, screwing work can be easily carried out at the side surface of battery stacked body 11.

[Fastening Member-Side Fixing Portion 27]

Battery fastening members 20 have fastening member-side fixing portions 27 for fixing bracket-side fixing portions 31 of intermediate bracket 30 at the intermediate portion in the longitudinal direction of each of the pair of battery fastening members 20. As shown in FIG. 7, a direction of fixing axis along which intermediate bracket 30 and each of battery fastening members 20 are fixed, is substantially perpendicular to the main surface of each of battery fastening members 20. Thus, since the fixing axis is provided such that axis force is applied to the direction perpendicular to battery fastening members 20, load to battery fastening member 20 can be reduced.

In addition, the screw portions are disposed on the same line, at each of the side surfaces of intermediate bracket 30. Here, when screw portions are configured so as to pass through the intermediate bracket, this configuration can improve strength. In this case, it is necessary to prepare long screws corresponding to the width of the intermediate bracket, and thus metal material is increased, as the result, weight and parts cost are increased. Therefore, in the configuration of FIG. 7, screws do not pass through the side surfaces of intermediate bracket 30. The screw portions as separate parts are provided on the same line at each of the side surfaces of intermediate bracket 30, and the screw portions are disposed in spaced relationship with each other. Thus, the length of the screw is shortened, and use amount of metal material is reduced, and then light weight and low cost can be accomplished.

[Fastening Member-Side Second Fixing Portion 28]

Further, fixing configuration where battery fastening member 20 is fixed to intermediate bracket 30, can be plural structures. For example, at the middle of first bent board 21, fastening member-side second fixing portion 28. In battery fastening member 20 shown in FIGS. 1 to 3, a first bent board screw hole as fastening member-side second fixing portion 28, projecting from the middle of first bent board 21, is formed. Thus, since fastening member-side second fixing portion 28 is provided at a portion crossing fastening member-side fixing portions 27, battery fastening member 20 and intermediate bracket 30 can be fixed at locations where those fixing portions cross each other, and then strong fixing structure against forces from different directions can be realized. Also, at the upper surface of intermediate bracket 30, a bracket-side second screw hole as bracket-side second fixing portion 32, is opened at a portion facing the first bent board screw hole. Accordingly, a screw passes through the first bent board screw hole and the bracket-side second screw hole, and is fixed from the upper surface of battery stacked body 11.

Further, fixing configuration where battery fastening member 20 is fixed to intermediate bracket 30, can be three or more structures. For example, in the example of FIGS. 1 to 3, a second bent board screw hole as fastening member-side third fixing portion 28B, at the middle of second bent board 22, is formed. Similarly, also at intermediate bracket 30, a bracket-side third screw hole as bracket-side third fixing portion 33, is opened at a portion facing fastening member-side third fixing portion 28B.

In addition, since intermediate bracket 30 shown in FIG. 7 has openings at the middle portion, the used amount of resin can be reduced. Further, intermediate bracket 30 is formed in a shape which fits projections and recesses of cooling gap 2b in a case where separators 2 are disposed at both surfaces of intermediate bracket 30.

In the example of FIG. 2, FIG. 3, intermediate bracket 30 is coupled to separators 2 in a state where the side surfaces of secondary battery cells 1 are covered with separators 2. In other words, separators 2 are interposed between secondary battery cells 1 and intermediate bracket 30. However, regarding the secondary battery cells which contact the intermediate bracket, the separator can be omitted. In this case, the above-mentioned cooling gap or the like is formed on the surface of the intermediate bracket, such that the surface of the secondary battery cell is covered with the side surface of the intermediate bracket.

Modified Example

Figure 8A:
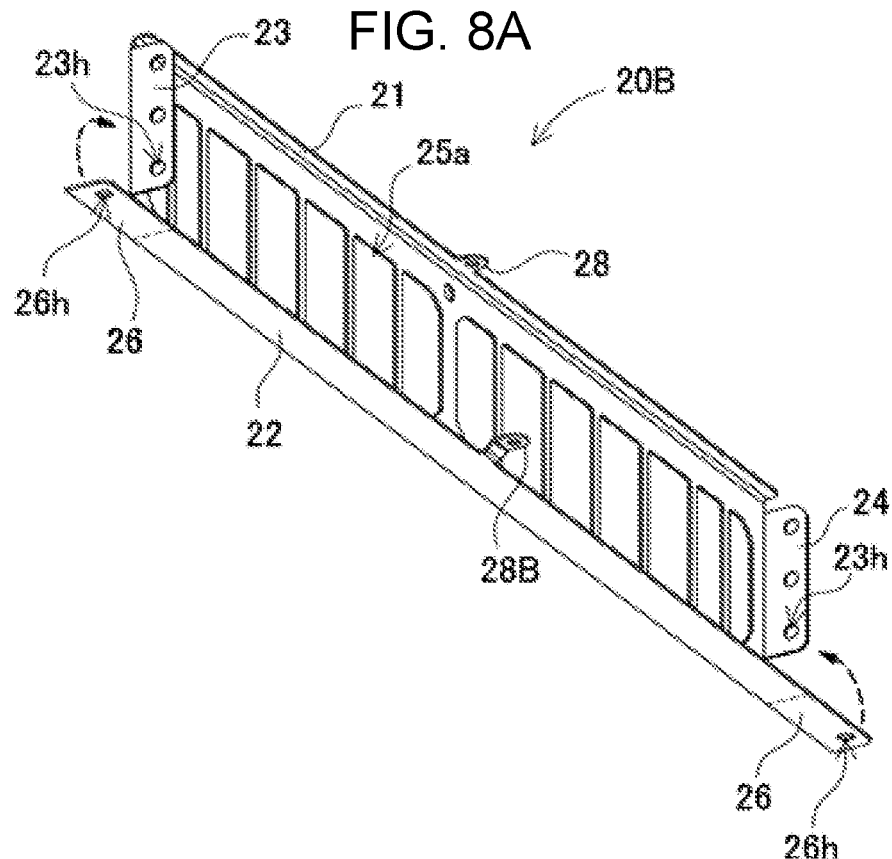
FIG. 8A is a perspective view from the diagonally lower side in a state where projecting boards are before bending, at end edges of a battery fastening member relating to a modified example.
Figure 8B:
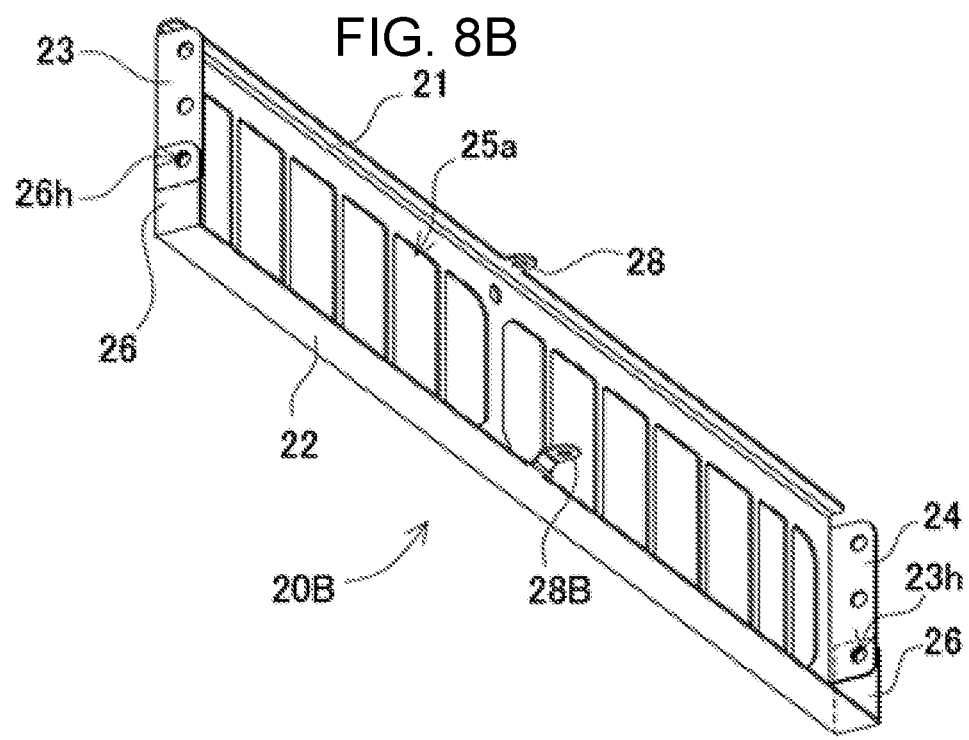
FIG. 8B is a perspective view in a state where the projecting boards of FIG. 8A are bent.

As shown in the above-mentioned FIGS. 1 to 3, in battery fastening member 20, the end edges of fastening main surface 25 are bent. Otherwise, the bent end edge is further bent, and bent boards are fixed each other. This structure can improve strength. Such a example as battery fastening member 20B relating to the modified example, is shown in perspective views of FIG. 8A, FIG. 8B. An end edge of a longitudinal direction of second bent board 22 of each of battery fastening members 20B shown in these figures, projects from the end edge of fixing main surface 25, as projecting board 26. A projecting board-side screw hole 26h at projecting board 26 for screwing end plate 3, is open. In contrast, third screw hole 23h at third bent board 23 is open. Projecting board 26 is bent so as to overlap third bent board 23, as shown from a state of FIG. 8A to FIG. 8B. In this state, the projecting board-side screw hole is aligned to third screw hole 23h, and they are fixed to end plate 3 by a common screw. By using this configuration, in battery fastening member 20B, a portion screwed to end plate 3 is configured of the crossing boards like three dimensions, and then strong fixing structure can be realized.

The power supply device described above can be used for a vehicle-mounted power supply. Examples of a vehicle having a power supply device mounted include electric vehicles such as hybrid cars or plug-in hybrid cars driven by both an engine and a motor, or electric-motor driven automobiles such as electric automobiles only driven by a motor. The power supply device can be used for power supplies of these vehicles.

(Power Supply Device for Hybrid Automobile)

Figure 9:
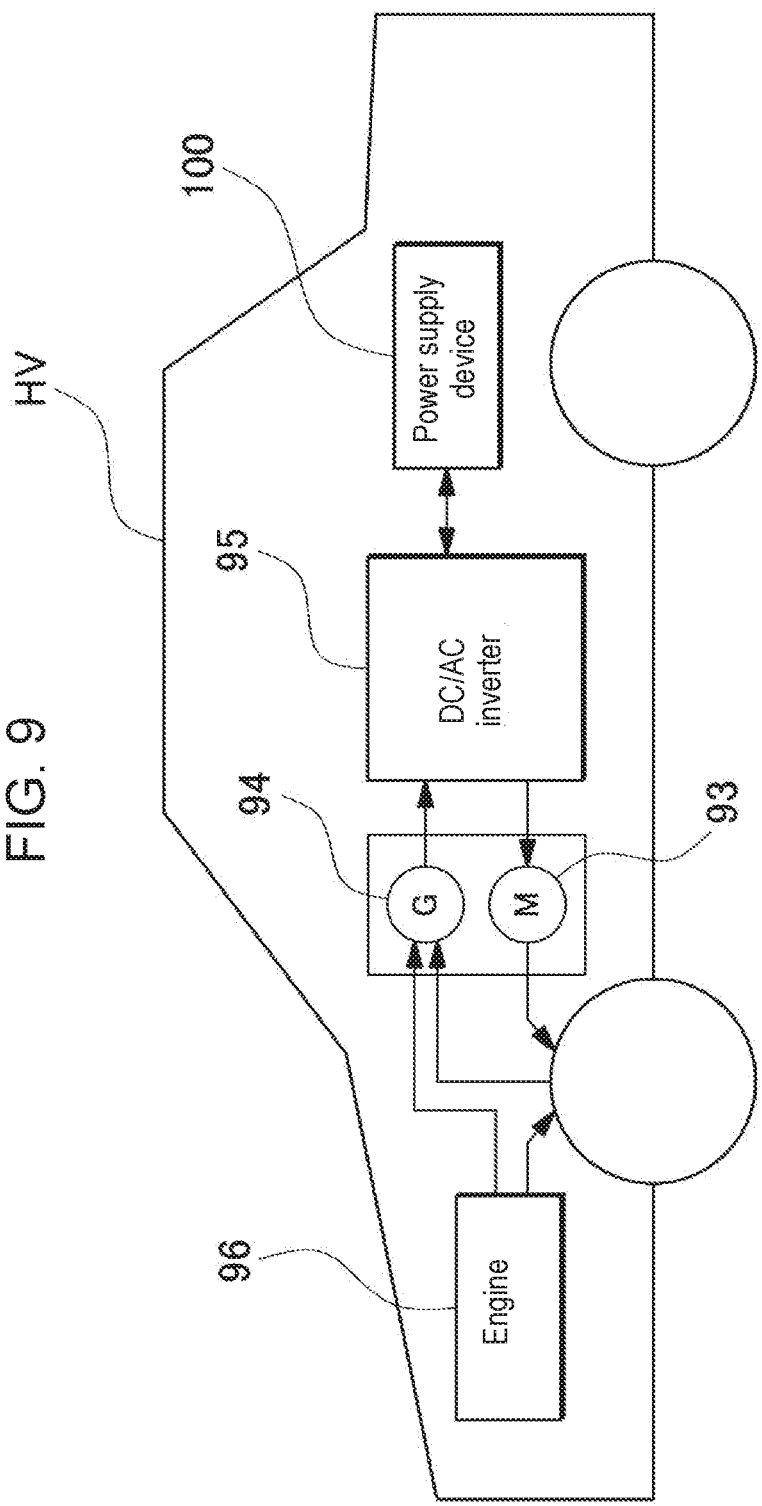
FIG. 9 is a block diagram showing an example in which a power supply device is mounted on a hybrid car driven by both an engine and a motor.

FIG. 9 shows an example in which a power supply device is mounted on a hybrid car driven by both an engine and a motor. Vehicle HV equipped with a power supply device that is shown in this drawing includes: engine 96 and motor 93 for travel that make vehicle HV travel; power supply device 100 for supplying power to motor 93; and power generator 94 for charging the battery in power supply device 100. Power supply device 100 is connected to motor 93 and power generator 94 via direct current (DC)/alternating current (AC) inverter 95. Vehicle HV travels by both of motor 93 and engine 96 while charging and discharging the battery of power supply device 100. Motor 93 is driven when the engine efficiency is low, for example during acceleration or low-speed travel, and makes the vehicle travel. Motor 93 receives power from power supply device 100 and is driven. Power generator 94 is driven by engine 96 or is driven by regenerative braking when the vehicle is braked, and the battery of power supply device 100 is charged.

(Power Supply Device for Electric Car)

Figure 10:
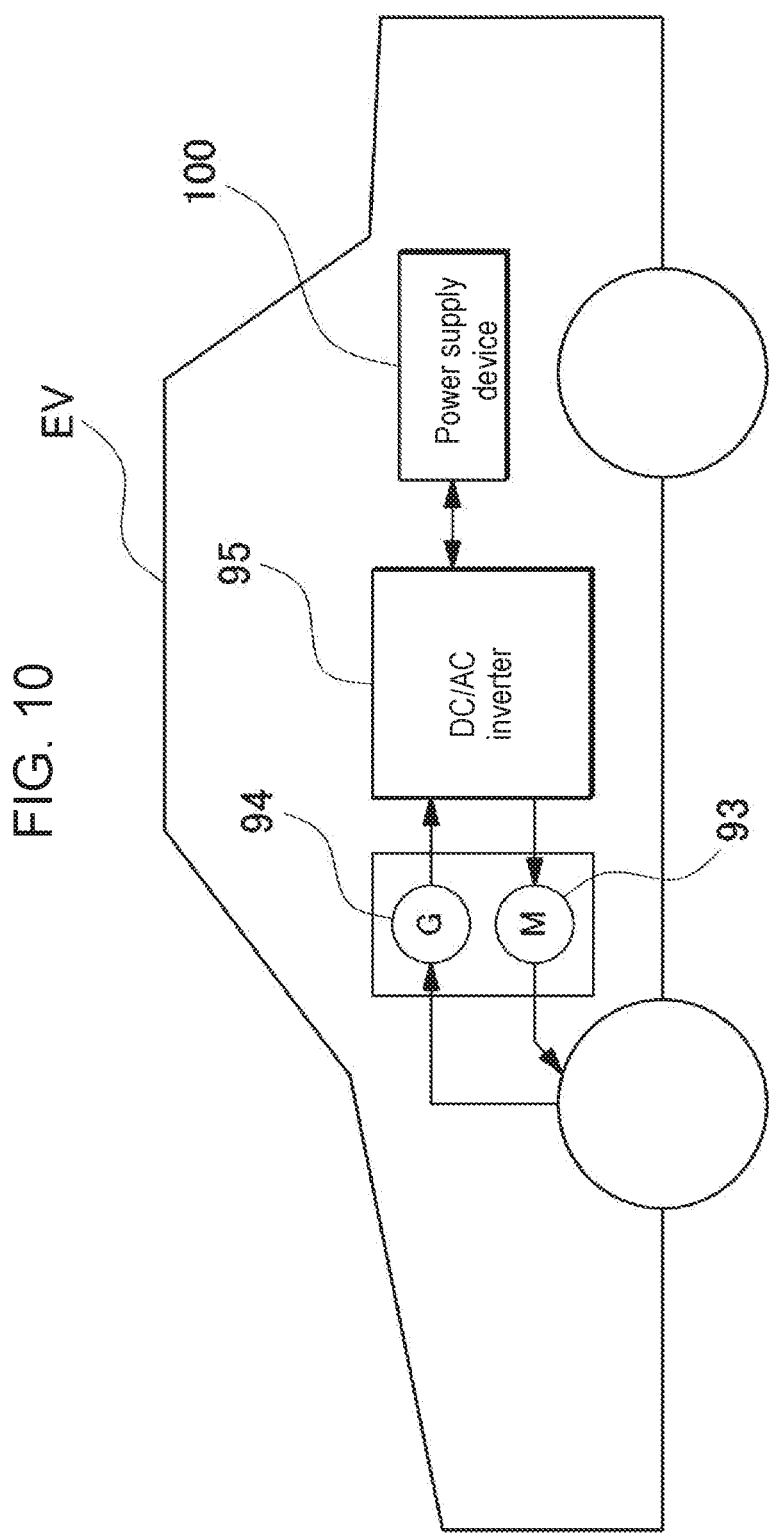
FIG. 10 is a block diagram showing an example in which a power supply device is mounted in an electric car traveling only by a motor.

FIG. 10 shows an example in which a power supply device is mounted in an electric car traveling only by a motor. Vehicle EV equipped with a power supply device that is shown in this drawing includes: motor 93 for travel that makes vehicle EV travel; power supply device 100 for supplying power to motor 93; and power generator 94 for charging the battery in power supply device 100. Motor 93 receives power from power supply device 100 and is driven. Power generator 94 is driven by energy when regenerative braking is applied to vehicle EV, and the battery of power supply device 100 is charged.

Exemplary embodiments and examples of the present invention have been described with reference to the drawings. The exemplary embodiments and examples show devices for embodying the technical ideas of the present invention. The present invention is not limited to the above-mentioned devices. In the present description, members shown in the scope of claims are not limited to the members of the exemplary embodiments. Especially, the sizes, materials, and shapes of the components and relative arrangement between the components, which are described in the exemplary embodiments, do not limit the scope of the present invention but are simply explanation examples as long as there is no specific description. The sizes and the positional relation of the members in each drawing are sometimes exaggerated for clearing the explanation. Furthermore, in the above-mentioned explanation, the same names or the same reference marks denote the same members or same-material members, and detailed description is appropriately omitted. Furthermore, regarding the elements constituting the present invention, a plurality of elements may be formed of the same member, and one member may serve as the plurality of elements. Conversely, the function of one member may be shared by the plurality of members.

A power supply device according to the present invention can be suitably used as power supply devices of plug-in hybrid vehicles that can switch between the EV drive mode and the HEV drive mode, hybrid electric vehicles, electric vehicles, and the like. The power supply device can be appropriately used for the following applications: a backup power supply device mountable in a rack of a computer sever; a backup power supply device used for wireless base stations of mobile phones; a power source for storage used at home or in a factory; an electric storage device combined with a solar battery, such as a power source for street lights; and a backup power source for traffic lights.

The invention claimed is:

1. A power supply device comprising:
   a plurality of secondary battery cells;
   separators having insulation property which are interposed between adjacent ones of secondary battery cells in a state where the plurality of secondary battery cells are stacked, thereby forming a battery stacked body;
   end plates disposed at both end surfaces of the battery stacked body where the secondary battery cells and the separators are alternatively stacked;
   a pair of battery fastening members which fasten the end plates to each other; and
   an intermediate bracket interposed at an intermediate portion at a central location of the battery stacked body,
   wherein the pair of battery fastening members have fastening member-side fixing portions for fixing the intermediate bracket at the intermediate portion in a longitudinal direction of each of the pair of battery fastening members,
   the intermediate bracket has bracket-side fixing portions which are fixed to the fastening member-side fixing portions,
   each of the bracket-side fixing portions respectively protrudes from side surfaces of the intermediate bracket that face the pair of battery fastening members in the longitudinal direction,
   the bracket-side fixing portions are open at the side surfaces of the intermediate bracket, and the intermediate bracket is made of resin.

2. The power supply device according to claim 1, wherein a direction of fixing axis along which the intermediate bracket and each of the battery fastening members are fixed by screw, is substantially perpendicular to a main surface of each of the battery fastening members.

3. The power supply device according to claim 1, wherein each of the battery fastening members has:
   a fixing main surface having a flat board shape;
   a first bent board which is at least partially bent at one end edge along the longitudinal direction of the fixing main surface;
   a second bent board which is at least partially bent at another end edge along the longitudinal direction of the fixing main surface; and
   a third bent board and a fourth bent board which are at least partially bent at end edges crossing the longitudinal direction of the fixing main surface.

4. The power supply device according to claim 3, wherein an end edge of a longitudinal direction of the second bent board of each of the battery fastening members, projects from an end edge of the fixing main surface, as a projecting board,
   a projecting board-side screw hole at the projecting board for screwing one of the end plates, is open,
   a third screw hole at the third bent board is open,
   the projecting board is bent so as to overlap the third bent board, and the projecting board-side screw hole is aligned to the third screw hole.

5. The power supply device according to claim 1, wherein the bracket-side fixing portions are insert-molded integrally with the intermediate bracket, as metal screw portions for screwing to the battery fastening members.

6. The power supply device according to claim 5, wherein the metal screw portions are provided on the same line at each of the side surfaces of the intermediate bracket, and the metal screw portions are disposed in spaced relationship with each other on the same line.

7. The power supply device according to claim 1, wherein the pair of battery fastening members have fastening member-side second fixing portions for fixing the intermediate bracket at portions crossing the fastening member-side fixing portions in the intermediate portion in the longitudinal direction of each of the pair of battery fastening members, and
   the intermediate bracket has bracket-side second fixing portions which are fixed to the fastening member-side second fixing portions, at portions crossing the bracket-side fixing portions.

8. A vehicle comprising the power supply device according to claim 1.

* * * * *